(12) United States Patent
Noth

(10) Patent No.: US 10,595,669 B2
(45) Date of Patent: Mar. 24, 2020

(54) CODE AND CONTAINER OF SYSTEM FOR PREPARING A BEVERAGE OR FOODSTUFF

(71) Applicant: NESTEC S.A., Vevey (CH)

(72) Inventor: Andre Noth, Pully (CH)

(73) Assignee: Societe des Produits Nestle S.A., Vevey (CH)

( * ) Notice: Subject to any disclaimer, the term of this patent is extended or adjusted under 35 U.S.C. 154(b) by 232 days.

(21) Appl. No.: 15/569,119

(22) PCT Filed: Feb. 23, 2016

(86) PCT No.: PCT/EP2016/053735
§ 371 (c)(1),
(2) Date: Oct. 25, 2017

(87) PCT Pub. No.: WO2016/173738
PCT Pub. Date: Nov. 3, 2016

(65) Prior Publication Data
US 2018/0116446 A1    May 3, 2018

(30) Foreign Application Priority Data
Apr. 30, 2015  (EP) .................................. 15165921

(51) Int. Cl.
*A47J 31/44* (2006.01)
*B65D 85/804* (2006.01)
*A47J 31/00* (2006.01)
(52) U.S. Cl.
CPC ......... *A47J 31/4492* (2013.01); *A47J 31/002* (2013.01); *B65D 85/8043* (2013.01)

(58) Field of Classification Search
CPC .. A47J 31/4492; A47J 31/002; B65D 85/8043
USPC ..................................................... 235/462.03
See application file for complete search history.

(56) References Cited

U.S. PATENT DOCUMENTS

| 2010/0078480 | A1  | 4/2010 | Aker |
| 2010/0133351 | A1* | 6/2010 | Yoshida .............. G06F 3/03545 235/494 |
| 2012/0055342 | A1  | 3/2012 | Traitler et al. |
| 2014/0242239 | A1  | 8/2014 | Boggavarapu |

(Continued)

FOREIGN PATENT DOCUMENTS

| EP | 2345352 | 7/2011 |
| EP | 2525691 | 4/2014 |
| WO | 2014029803 | 2/2014 |

*Primary Examiner* — Daniel A Hess
(74) *Attorney, Agent, or Firm* — K&L Gates LLP

(57) ABSTRACT

A container for a foodstuff or beverage preparation machine, the container for containing beverage or foodstuff preparation material and comprising on a surface thereof a code encoding preparation information, the code comprising a reference portion and a data portion: the reference portion comprising a linear arrangement of at least two reference units defining a reference line r, the data portion having an encoding area comprising at least one data unit, wherein said data unit is arranged on an encoding line D that intersects the reference line r, the data unit occupies any continuous distance d along the encoding line D within the bounds of the encoding area as a variable to at least partially encode a parameter of the preparation information, whereby said encoding line D is linear and arranged orthogonal to the reference line r.

17 Claims, 7 Drawing Sheets

(56) References Cited

U.S. PATENT DOCUMENTS

2015/0017293 A1   1/2015  Carr et al.
2015/0262051 A1*  9/2015  Yoshida .......... G06K 19/06037
                                                        235/454

* cited by examiner

CODE AND CONTAINER OF SYSTEM FOR PREPARING A BEVERAGE OR FOODSTUFF

CROSS REFERENCE TO RELATED APPLICATIONS

The present application is a National Stage of International Application No. PCT/EP2016/053735, filed on Feb. 23, 2016, which claims priority to European Patent Application No. 15165921.6, filed on Apr. 30, 2015, the entire contents of which are being incorporated herein by reference.

TECHNICAL FIELD

The described embodiments relate generally to beverage or foodstuff preparation systems which prepare a beverage or foodstuff from containers such as coffee capsules, and in particular to codes arranged on the container that encode preparation information for reading by a machine of said system.

BACKGROUND

Increasingly preparation machines for the preparation of a beverage or foodstuff are configured to operate using a container that comprises a single-serving of a preparation material, e.g. coffee, tea, ice cream, yoghurt. The machine may be configured for preparation by processing said material in the container, e.g. with the addition of fluid, such as milk or water, and the application of mixing thereto, such a machine is disclosed in PCT/EP13/072692. Alternatively, the machine may be configured for preparation by at least partially extracting an ingredient of the material from the container, e.g. by dissolution or brewing. Examples of such machines are provided in EP 2393404 A1, EP 2470053 A1, EP 2533672 A1, EP 2509473 A1, EP 2685874 A1.

The increased popularity of these machines may be partly attributed to enhanced user convenience compared to a conventional preparation machine, e.g. compared to a manually operated stove-top espresso maker or cafetiére (French press).

It may also be partly attributed to an enhanced preparation process, wherein preparation information specific to the container and/or preparation material therein is: encoded in a code on the container; read by the preparation machine; used by the machine to optimise the preparation process. In particular, the preparation information may comprise operational parameters of the machine, such as: fluid temperature; preparation duration; mixing conditions.

Accordingly, there is a need to code preparation information on the container. Various such codes have been developed, an example is provided in EP 2594171 A1, wherein a periphery of a flange of a capsule comprises a code arranged thereon. The code comprises a sequence of symbols that can be printed on the capsule during manufacture. A drawback of such a code is that its encoding density is limited, i.e. the amount of preparation information that it can encode is limited. A further drawback is that the code is highly visible and may be considered aesthetically displeasing. EP2525691 discloses a container with a 2D barcode, which has a higher albeit limited encoding density.

SUMMARY

An object of the present disclosure is to provide a container for beverage or foodstuff preparation material that comprises a code that has a high encoding density. It would be advantageous to provide such a code that is less visible than the prior art. It would be advantageous to provide such a code that is un-complicated such that it does not comprise a large number of symbols. It would be advantageous to provide such a code that is cost-effective to produce and that can be read by a cost-effective code reader. It would be advantageous to provide such a code that can be reliably read and processed.

Disclosed herein according to a first embodiment is provided a container for use (e.g. it is suitably dimensioned) by a foodstuff or beverage preparation machine, in particular the machine disclosed in the second embodiment. The container for containing beverage or foodstuff preparation material (e.g. it has an internal volume and may be food safe). The container may be a single-serving container e.g. it is dimensioned for containing a dosage of beverage or foodstuff material for preparation of a single serving (e.g. pre portioned) of said product. The container may be a single-use container, (e.g. it is intended to be used in a single preparation process after which it is preferably rendered unusable, preferably by perforation, penetration, removal of a lid or exhaustion of said material). The container comprises (e.g. on a surface thereof) a code encoding preparation information, the code comprising a reference portion and a data portion: the reference portion providing reference position for the data portion and comprises a arrangement, which may be linear, of at least two reference units defining a reference line r; the data portion comprising at least one data unit, wherein the data unit is arranged on an encoding line D along (e.g. with at least a portion thereof, generally a centre, intersecting said line) that intersects the reference line r, the data unit occupies any continuous distance d along the encoding line D, as opposed to discrete positions, as a variable to encode a parameter of the preparation information, whereby the said encoding line D is linear and arranged orthogonal to the reference line r. The data portion preferably has an encoding area within the bounds of which the data unit is arranged.

Accordingly, an object of the disclosure is solved since the code has a high encoding density as it can encode information in a continuous manner rather than discrete manner.

The preparation information may comprise information that is related to a preparation process, e.g. one or more parameters used by the machine such as: temperature; torque and angular velocity (for mixing units of machines which effect mixing); flow rate/volume; pressure; % cooling power; time (e.g. for which a phase comprising one or more of the aforesaid parameters are applied for); expiry date; container geometric properties; phase identifier (for containers comprising multiple codes, whereby each of which encodes a distinct phase of a preparation operation); container identifier; a recipe identifier that may be used to retrieve one or more parameters of the machine which are used by the machine to prepare the product, wherein said parameters may be stored on the machine; pre-wetting volume.

The code preferably has a peripheral length, (e.g. a side-length of a rectangle) of 600-1600 µm or 600-6000 µm. Accordingly an object of the disclosure is achieved since the code is not particularly visible. More particularly, the units (i.e. the data units and reference units) that comprise the code preferably have a unit length of 50-250 µm. The aforesaid unit length may be defined as: a diameter for a substantially circular unit; a side length for a quadrilateral unit; other suitable measure of length for a unit of another shape. The encoding area is preferably a right-angled parallelogram, e.g. a square or rectangle) at a periphery, whereby the encoding lines D extend parallel to each other and parallel to a side-length thereof.

The data portion may comprise a plurality of encoding lines D (e.g. up to 2, 3, 4, 5, 6, 10, 16, 20 or more), each comprising a corresponding arrangement of a data unit (i.e. the data unit is arranged a distance d from an intersection point to at least partially encode a parameter). Preferably, the encoding lines D are concentrically arranged and preferably intersect the reference line r at a different position. A data unit may be arranged on the encoding lines any continuous distance d from the intersection point. One advantage is that the code has a high encoding density as it can encode information in a continuous manner rather than a discrete manner. The data units may be arranged only discrete distances from the intersection point (i.e. the data unit can only occupy one of a plurality of predetermined positions along the line D, which generally do not overlap and may have a discrete separation between adjacent positions). In the instance of more than one encoding line D and/or more than one data units arranged along the line(s) the data units may be arranged with combinations of continuous and discrete distances.

The reference portion may comprise a reference unit as a reference line orientation identifier. The reference unit of said orientation identifier may be identifiable from other units of code by one or more means, e.g.: it is without an associated encoding line D that has a data unit arranged thereon and that intersects said reference unit; it comprises a reference unit distinct from the other units of the code in terms of one of more of the following: shape, size, colour; it is arranged at an end of said reference line r. One advantage is that it is convenient for an image processor to determine an orientation of the reference line r.

A further reference unit of the reference portion may be identifiable by one or more of the following: it is arranged at a predetermined reserved position from said orientation identifier (e.g. 600-800 µm), whereby the data units are not arranged at said predetermined position; it is arranged at a greater position from the orientation identifier than the data units; it is distinct from the other units of the code in terms of one of more of the following: shape, size, colour. One advantage is that the reference line r can be conveniently determined by locating the orientation identifier and the further reference unit.

The encoding line D may intersect the reference line r at a reference position and the reference position may be absent a reference unit, whereby the or each reference position is arranged a predetermined distance along the reference line, e.g. from the reference unit of the orientation identifier or other position, e.g. the reference units are not arranged within or bounding a perimeter of the encoding area. One advantage is that the encoding density is increased since the data units can be arranged in close proximity to the reference line r, e.g. without needing to ensure there is adequate separation between the data unit and a reference unit that would otherwise be on said line. A portion of the encoding area may be bounded by the reference line r or overlap (e.g. it extends through) the reference line r. The aforesaid predetermined distance can be defined as a set amount such that the reference positions are equidistant e.g. a distance between the ends of the reference line r divided by a number of reference positions or divided by the number of reference positions plus a particular amount such as 1 or 2.

Alternatively the encoding line D may intersect the reference line r at a reference position (e.g. typically each reference position other than the orientation identifier position), whereby the reference position comprises a reference unit. One advantage is that the image processor can determine conveniently the positions of the encoding lines D. A portion of the encoding area may be proximal the reference line r.

The data unit may further encode metadata associated with the parameter. The metadata is preferably encoded discretely (e.g. it can assume one of a predetermined number of values). The metadata is generally to: enable identification of the particular parameter; and/or a property associated with the parameter (e.g. a ± of an exponent). A unit length of a data unit may be selected from one of a plurality of predetermined unit lengths as a variable to encode the metadata. The aforesaid unit length may be defined as: a diameter for a substantially circular unit; a side length for a quadrilateral unit; other suitable measure of length for a unit of another shape. An offset of a centre of a data unit from the encoding line D along a linear line, the line at a point of intersection with the encoding line D is orthogonal thereto, may be selected from one of a plurality of predetermined offsets as a variable to encode the metadata. Preferably said offset is achieved within the bounds of at least part of the associated data unit intersecting the encoding line D.

A plurality of data units may be arranged along a single encoding line D. One advantage is that the encoding density is increased. Each of the said data units may encode a separate parameter. Alternatively a plurality of the data units may encode a single parameter, whereby a distance d encoding said parameter may be a function (e.g. an average or a multiple) of the distances do of said plurality of data units. In such an arrangements each data unit may be identifiable by the metadata.

The data units and reference units may be formed by one of the following: printing (e.g. by a conventional ink printer: one advantage is that the code can be conveniently and cost-effectively formed); engraving; embossing. The code may be formed directly on a surface of the container, e.g. the substrate for the units is integral with the container. Alternatively the code may be formed on an attachment, which is attached to the container.

The container may comprise the beverage or foodstuff preparation material contained therein. The container may comprise one of the following: a capsule; packet; a receptacle for consumption of the beverage or foodstuff therefrom. The capsule may have an internal volume of 5-80 ml. The receptacle may have an internal volume of 150-350 ml. The packet may have an internal volume of 150-350 ml or 200-300 ml or 50-150 depending on the application.

Disclosed herein according to a second embodiment is provided a beverage or foodstuff preparation system comprising a container according to the first embodiment and a beverage or foodstuff preparation machine, said preparation machine comprising: a preparation unit to receive a container and to prepare a said beverage or foodstuff therefrom; a code processing system operable to: obtain a digital image of the code of the container; process said digital image to decode the encoded preparation information; a control system operable to effect one more of the following: control of said preparation unit using said decoded preparation information; use the operation information to monitor container consumption for re-ordering, e.g. via a server system through a communication interface; use preparation information to determine if a container has exceeded its expiry date.

The preparation unit is generally is operable perform said preparation by the addition of fluid, such as water or milk to the beverage or foodstuff material. The container processing subsystem may comprise one of an: an extraction unit; a dissolution unit; a mixing unit. The container processing subsystem may further comprise a fluid supply that is operable to supply fluid to the aforesaid unit. Generally the fluid supply comprises a fluid pump and a fluid heater. The aforesaid units may be configured for operation with a container containing beverage or foodstuff material.

Processing of the digital image to decode the preparation information may comprise: locating the units of the code; identifying the reference units and determining therefrom a reference line r; determining for each data unit a distance d along the encoding line D from the reference line r.

The locating of the units of the code (i.e. data and reference units) may comprise one or more of the following: conversion of the digital image to a binary image; determining a centre of the units by feature extraction; determining a size/area/shape of the units by pixel integration (i.e. determining a number of pixels of a shaded region that comprise the unit).

Identifying the reference units and determining therefrom a reference line r may comprise one or more of the following: identifying units with a linear arrangement; identifying units that are a predetermined distance apart; identifying units that are a particular shape or size, e.g. a reference unit defining an orientation identifier.

Determining for each data unit a distance d along the encoding line D from the reference line r may comprise determining a perpendicular distance between a centre of the data unit and the reference position, and may include correcting for magnification/reading distance.

Processing of the digital image to decode the preparation information may further comprise converting a distance d into an actual value of a parameter $V_p$, using a stored relationship (e.g. stored on a memory unit of the machine) between the parameter and distance d. The relationship may be linear, e.g. $V_p \infty d$ and/or it may be non-linear. The relationship may comprise at least one selected from a group consisting of: a logarithmic relationship, e.g. $V_p \infty \log(d)$; an exponential relationship, e.g. $V_p \infty e^d$; a polynomial; a step function; linear. Exponential and logarithmic relationships are particular advantageous when the accuracy of a parameter is important at low values and less important at high values or the converse respectively. Typically the relationship is stored as an equation or as a lookup table. The relationship may be applied to any suitable variable of the preparation information, such as: temperature; torque; flow rate/volume; pressure; % cooling power. One advantage is the execution of complex recipes, which may be determined by the particular material in the container and the functionality of the machine.

Processing of the digital image to decode the preparation information may further comprise determining metadata associated with the data unit of the encoded parameter, e.g. by one or more of the following: determining a unit length by feature extraction or overall area/shape by pixel integration; determining an offset of a data unit to the encoding line D by feature extraction.

Disclosed herein according to a third embodiment is a method of preparing a beverage or foodstuff, using the system according to the second embodiment, the method comprising: obtaining a digital image of the a code of a container according to the first embodiment, the digital image comprising the encoded preparation information; processing said digital image to decode the preparation information; operating a control system to effect one more of the following: control of said preparation unit using said decoded preparation information; use the operation information to monitor container consumption for re-ordering, e.g. via a server system through a communication interface; use preparation information to determine if a container has exceeded its expiry date.

The method may further comprise any of the steps for processing of the digital image as defined by the third embodiment.

Disclosed herein according to a fourth embodiment is an attachment configured for attachment to a container of a beverage or foodstuff preparation machine according to the first embodiment. The attachment may comprise: a carrier carrying on a surface thereof a code as described in the first embodiment; an attachment member for attachment to said container. The attachment member is preferably configured for attaching said carrier to the container as if it were formed integrally on the container. In this way it can be read by the image capturing device as if it formed integrally thereto. Examples of suitable attachment members comprise: an adhesive strip; a mechanical fastener such as a clip or bolt.

Disclosed herein according to a fifth embodiment is provided an attachment configured for attachment to a beverage or foodstuff preparation machine according to the second embodiment. The attachment may comprise: a carrier carrying on a surface thereof a code as described in the first embodiment; an attachment member for attachment to said machine. The attachment member is preferably configured for attaching said carrier to the machine at a position between an image capturing device of said machine and the container when received, such that the code thereon is proximate said container. In this way it can be read by the image capturing device as if it were attached to the container. Examples of suitable attachment members comprise: extensions attached to said carrier comprising an adhesive strip or a mechanical fastener such as a clip, bolt or bracket.

Disclosed herein according to a sixth embodiment is a use of a container as defined in the first embodiment or the attachments as defined in the fourth and fifth embodiment for a beverage or foodstuff preparation machine as defined in the second embodiment.

Disclosed herein according to a seventh embodiment is provided a computer program for a processor of a code processing system of a beverage or foodstuff preparation machine as defined the second embodiment, the computer program comprising program code to: obtain (e.g. by controlling an image capturing device) a digital image of a code of a container according to the first embodiment; process said digital image to decode the encoded preparation information. The functional units described by the computer programs generally herein may be implemented, in various manners, using digital electronic logic, for example, one or more ASICs or FPGAs; one or more units of firmware configured with stored code; one or more computer programs or other software elements such as modules or algorithms; or any combination thereof. One embodiment may comprise a special-purpose computer specially configured to perform the functions described herein and in which all of the functional units comprise digital electronic logic, one or more units of firmware configured with stored code, or one or more computer programs or other software elements stored in storage media. The computer program may further comprise program code for effecting any of the steps of processing of the digital image as defined by the second embodiment.

Disclosed herein according to an eighth embodiment is provided a non-transitory computer readable medium comprising the computer program according to seventh embodiment. The non-transitory computer readable medium may comprise a memory unit of the processor or other computer-readable storage media for having computer readable program code stored thereon for programming a computer, e.g. a hard disk, a CD-ROM, an optical storage device, a magnetic storage device, Flash memory.

Disclosed herein according to an eighth embodiment is a method of encoding preparation information, the method comprising forming a code on: a container for a beverage or foodstuff preparation machine, the container for containing beverage or foodstuff material; or an attachment for attachment to said container or said machine. The method may comprise encoding information with the code according to any feature of the first embodiment. In particular the method may comprise: arranging at least two reference units to define a reference line r of a reference portion; and least partially encoding a parameter of the preparation information with a data portion of the code by arranging a data unit on an encoding line D that intersects the reference line r, the data unit being arranged any distance d extending along the encoding line D from said intersection as a variable for said encoding, whereby said encoding line D is linear and is arranged orthogonal the reference line r at said intersection point. The method may comprise forming the code by one of the following: printing; engraving; embossing.

Disclosed herein according to a ninth embodiment is provided a use of a code as defined in the first embodiment for encoding preparation information, preferably on: a container of a beverage or foodstuff preparation machine, the container for containing beverage or foodstuff material as defined in the first embodiment; or an attachment according to the seventh or eighth embodiment.

Disclosed herein according to a tenth embodiment is an information carrying medium comprising the code according to the first embodiment. In particular the information carrying medium may comprise the container as defined herein, either of the attachments as defined herein, or a substrate, such as an adhesive strip of other suitable medium. The method of encoding preparation information according to the second embodiment may be applied to the information carrying medium. The method of decoding preparation information according to the third aspect may be applied to the information carrying medium. The beverage or foodstuff preparation machine according to the fourth embodiment may be configured for operation with the information carrying medium, e.g. via its attachment to the container or other suitable component, such as either of the aforedescribed attachments. The system according to fifth may comprise the information carrying medium. The method of preparing a beverage or foodstuff of the sixth embodiment may be adapted to comprise obtaining a digital image of the code of the information carrying medium.

The preceding summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Moreover, the above embodiments may be combined in any suitable combination to provide further embodiments. Other features, aspects, and advantages of the subject matter described herein will become apparent from the following Detailed Description, Figures, and Claims.

DETAILED DESCRIPTION OF EXEMPLARY EMBODIMENTS

Beverage Preparation System

Figure 1:
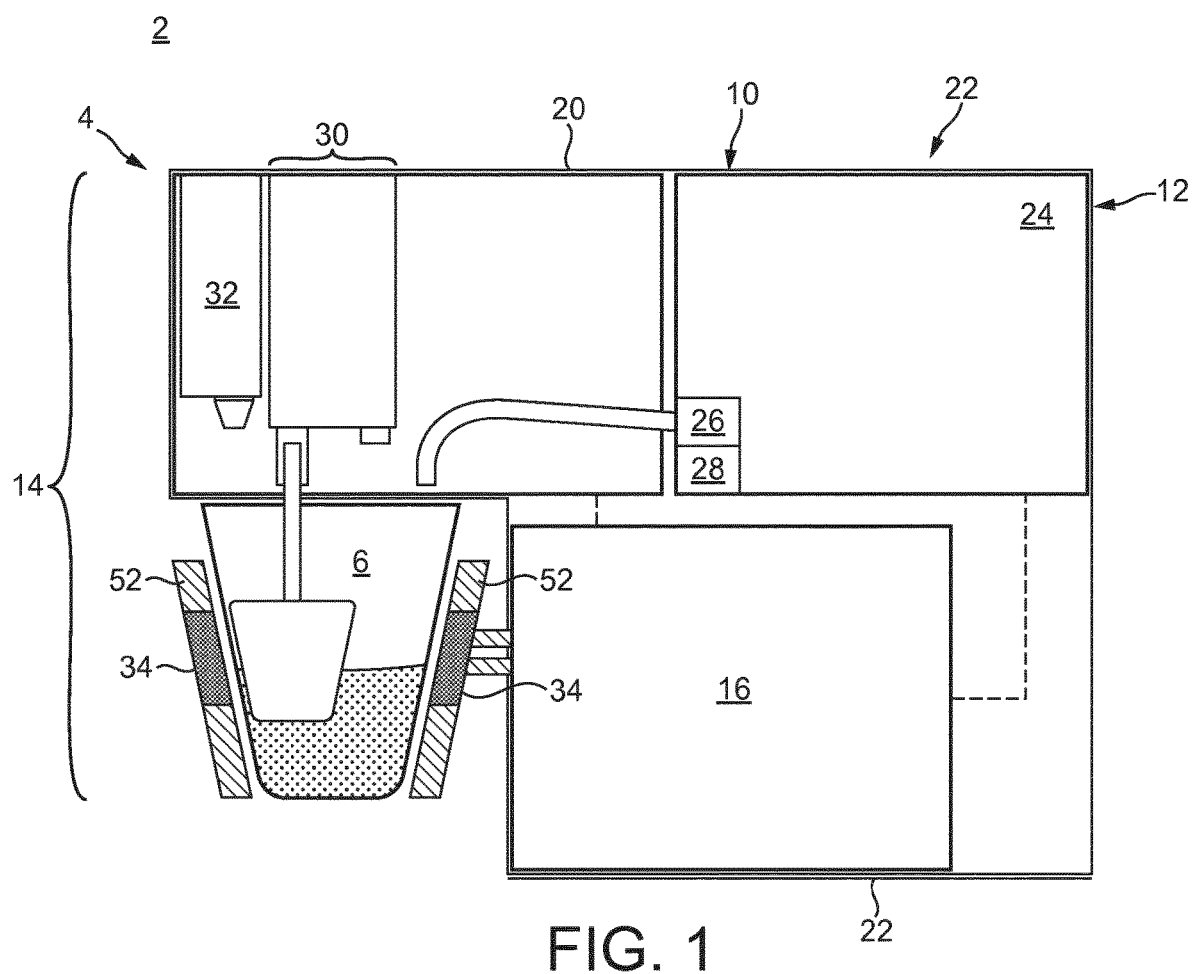
FIG. 1 is a diagrammatic drawing illustrating embodiments of beverage or foodstuff preparation systems that comprises a machine and a container according to embodiments of the present disclosure.

A beverage or foodstuff preparation system 2, an example of which is illustrated in FIG. 1, comprises: a beverage or foodstuff preparation machine 4; a container 6, which are described sequentially.

Preparation Machine

The beverage or foodstuff preparation machine 4 is operable to process a portion of beverage or foodstuff material, hereon preparation material, to a foodstuff and/or beverage for consumption by eating and/or drinking. A foodstuff material as defined herein may comprise a substance capable of being processed to a nutriment generally for eating, which may be chilled or hot, non-exhaustive examples of which are: yoghurt; mousse; parfait; soup; ice cream; sorbet; custard; smoothies. Preferably the foodstuff is a liquid, gel or paste foodstuff. A beverage material as defined herein may comprise a substance capable of being processed to a potable substance, which may be chilled or hot, non-exhaustive examples of which are: tea; coffee, including ground coffee; hot chocolate; milk; cordial. It will be appreciated that there is a degree of overlap between both definitions, i.e. said machine 4 can prepare both a foodstuff and a beverage.

The preparation machine 4 is generally dimensioned for use on a work top, e.g. it is less than 70 cm in length, width and height. The preparation machine 4 may have various configurations depending on the particular type of beverage and/or foodstuff it is intended for preparation of, examples of which are:

a first embodiment, an example of which is illustrated in FIG. 1, wherein the preparation machine 4 is generally for foodstuff preparation and is operable to prepare preparation material that is supplied in a container 6 that is a receptacle for end-user consumption therefrom, example of a suitable preparation machine is provided in PCT/EP13/072692, which is incorporated herein by reference;

a second embodiment wherein the preparation machine 4 is generally for foodstuff preparation and is operable to dispense preparation material that is supplied in a container 6, such as a packet or capsule, into an alternate receptacle for end-user consumption, wherein the foodstuff is prepared in the said receptacle, an example of a suitable preparation machine is disclosed in PCT/EP13/072692, and EP 14167344A, which is incorporated herein by reference;

a third embodiment wherein the preparation machine 4 is generally for beverage preparation and is operable to extract one or more ingredients of preparation material within a single use container 6, such as a packet or capsule, and to dispense the said ingredients into an alternate receptacle for end-user consumption, examples of suitable preparation machines 4 are disclosed in EP 2393404 A1, EP 2470053 A1, EP 2533672 A1, EP 2509473 A1 EP 2685874 A1, EP 2594171 A1, which are incorporated herein by reference.

For completeness a several such preparation machine 4 will now be described in more detail, which can be considered to comprise: a housing 10; a preparation unit 14; a control system 16; code processing system 18, which are described sequentially:

Housing

The housing 10 houses and supports the mentioned components and comprises: a base 20 for abutment of a horizontally arranged support surface; a body 22 for mounting thereto the other components.

Preparation Unit

Depending on the embodiment of the preparation machine 4, the preparation unit 14 may be operable to at least partially prepare a foodstuff/beverage from preparation material arranged in: a single-serving, single use container 6; a container 6 that is a receptacle for end-user consumption therefrom; a combination thereof. Embodiments of each configuration of will be discussed.

In general all the embodiments the preparation unit 14 comprises a fluid supply 12 that is operable to supply fluid used during preparation, which is in general water or milk that maybe conditioned (i.e. heated or cooled) typically to the container 6. The fluid supply 12 typically comprises: a reservoir 24 for containing fluid, which in most applications is 1-5 litres of fluid; a fluid pump 26, such as a reciprocating or rotary pump that may be driven by an electrical motor or an induction coil; a an optional fluid heater 28, which generally comprises an in-line, thermo block type heater; an outlet for supplying the fluid. The reservoir 24, fluid pump 26, fluid heater 28, and outlet are in fluid communication with each other in any suitable order. In an alternative example the fluid supply 12 may comprise a connection to an external fluid source e.g. a water main.

Preparation Unit for Preparation of Preparation Material Supplied in Container

According to the first embodiment of the preparation machine 4, an example of which is illustrated in FIG. 1, the preparation unit 14 is operable to prepare preparation material stored in a container 6 that is a receptacle, such as a cup, pot or other suitable receptacle configured to hold approximately 150-350 ml of prepared product. Herein the preparation unit 14 may be referred to as a mixing unit and may comprise an: agitator unit 30; auxiliary product unit 32; thermal exchanger 34; receptacle support 52, which will be described sequentially.

The agitator unit 30 is operable to agitate preparation material within the receptacle 6 for at least partial preparation thereof. The agitator unit 30 may comprise any suitable mixing arrangement, e.g. a: planetary mixer; spiral mixer; vertical cut mixer. Typically the agitator unit 30 comprises: an implement for mixing having a mixing head for contact with the preparation material; and a drive unit, such as an electric motor or solenoid, to drive the mixing implement. In a preferred example of a planetary mixer the mixing head comprises an agitator that rotates with a radial angular velocity W1 on an offset shaft that rotates with gyration angular velocity W2, such an arrangement is disclosed in PCT/EP13/072692.

The auxiliary product unit 32 is operable to supply an auxiliary product, such as a topping, to the container 6. The auxiliary product unit 32 comprises: a reservoir to store said product; an electrically operated dispensing system to effect the dispensing of said product from the reservoir.

The thermal exchanger 34 is operable to transfer and/or extract thermal energy from the container 6. In an example of transfer of thermal energy it may comprise a heater such as thermo block. In an example of extraction of thermal energy it may comprise heat pump such as a refrigeration-type cycle heat pump.

The receptacle support 52 is operable to support the container 6 during a preparation process such that the container 6 remains stationary during agitation of the preparation material therein by the agitator unit 30. The receptacle support 52 preferably is thermally associated with the thermal exchanger 34 such that transfer of thermal energy can occur with a supported receptacle.

According to the second embodiment of the preparation machine 4, the afore-described first embodiment preparation unit 14 further comprises a dispensing mechanism for receiving a container 6 and dispensing the associated preparation material into the receptacle, where it is prepared. Such an example is disclosed in EP 14167344 A. In a particular embodiment with this configuration the container may be a partially collapsible container, whereby the container is collapsible to dispense material stored therein. Such an example is disclosed in EP 15195547 A, which is incorporated herein by reference. In particular a collapsible portion of the container comprises a geometric configuration and/or portion of weakening such that said portion collapses in preference to a retaining portion upon the application of axial load through both portions. In such an embodiment the container processing unit 14 comprises a mechanical actuation device configured to apply an axial load to collapse said container, an example of which is provided in the reference application.

Preparation Unit for Extraction of Beverage Ingredients from Container

According to the third embodiment of the preparation machine 4, the preparation unit 14 may be referred to as an extraction unit and may be operable: to receive the container 6 containing preparation material; process the container 6 to extract one or more ingredients of a beverage therefrom, and to dispense the said ingredients into an alternate receptacle for end-user consumption. The container is generally a single-use, single-serving container such as a capsule or packet: a preparation unit 14 for use with the said capsule will initially be described followed by a variant machine for use with said packet.

In the example of the container 6 comprising a capsule the preparation unit 14 is operable to move between a capsule receiving position and a capsule extraction position, when moving from the capsule extraction position to the capsule receiving position, the extraction unit may be moved through or to a capsule ejection position, wherein a spent capsule can be ejected therefrom. The preparation unit typically comprises: an injection head; a capsule holder; a capsule holder loading system; a capsule insertion channel; a capsule ejection channel, which are described sequentially.

The injection head is configured to inject fluid into a cavity of the capsule when held by the capsule holder, and to this end has mounted thereto an injector, which has a nozzle that is in fluid communication with the outlet of the fluid supply.

The capsule holder is configured to hold the capsule during extraction and to this end it is operatively linked to the injection head. The capsule holder is operable to move to implement the said capsule receiving position and capsule extraction position: with the capsule holder in the capsule receiving position a capsule can be supplied to the capsule holder from the capsule insertion channel; with the capsule holder in the capsule extraction position a supplied capsule is held by the holder, the injection head can inject fluid into the cavity of the held capsule, and one or more ingredients can be extracted therefrom. When moving the capsule holder from the capsule extraction position to the capsule receiving position, the capsule holder can be moved through or to the said capsule ejection position, wherein a spent capsule can be ejected from the capsule holder via the capsule ejection channel.

The capsule holder loading system is operable to drive the capsule holder between the capsule receiving position and the capsule extraction position.

The preparation unit 14 can operate by means of injection of fluid at pressure into the cavity of the capsule 6, e.g. at up to 20 bar, which can be achieved by means of the injection head and pump 26. It may alternatively operate by centrifugation as disclosed in EP 2594171 A1, which is incorporated herein by reference. Further examples of suitable preparation units are provided in EP 2393404 A1, EP 2470053 A1, EP 2533672 A1, EP 2509473 A1 EP 2685874 A1 and EP 2594171 A1. The preparation unit 14 may alternatively comprise a dissolution unit configured as disclosed in EP 1472156 and in EP 1784344, which are incorporated herein by reference.

In the example of the container 6 comprising a packet the preparation unit 14 is operable to receive the packet and to inject, at an inlet thereof, fluid from the fluid supply 12. The injected fluid mixes with preparation material within the packet to at least partially prepare the beverage, which exits the packet via an outlet thereof. The preparation unit 14 comprises: a support mechanism to receive an unused packet and eject a spent packet; an injector configured to supply fluid to the packet from the outlet of the fluid supply. Further detail is provided in WO 2014/125123, which is incorporated herein by reference.

Control System

Figure 2:
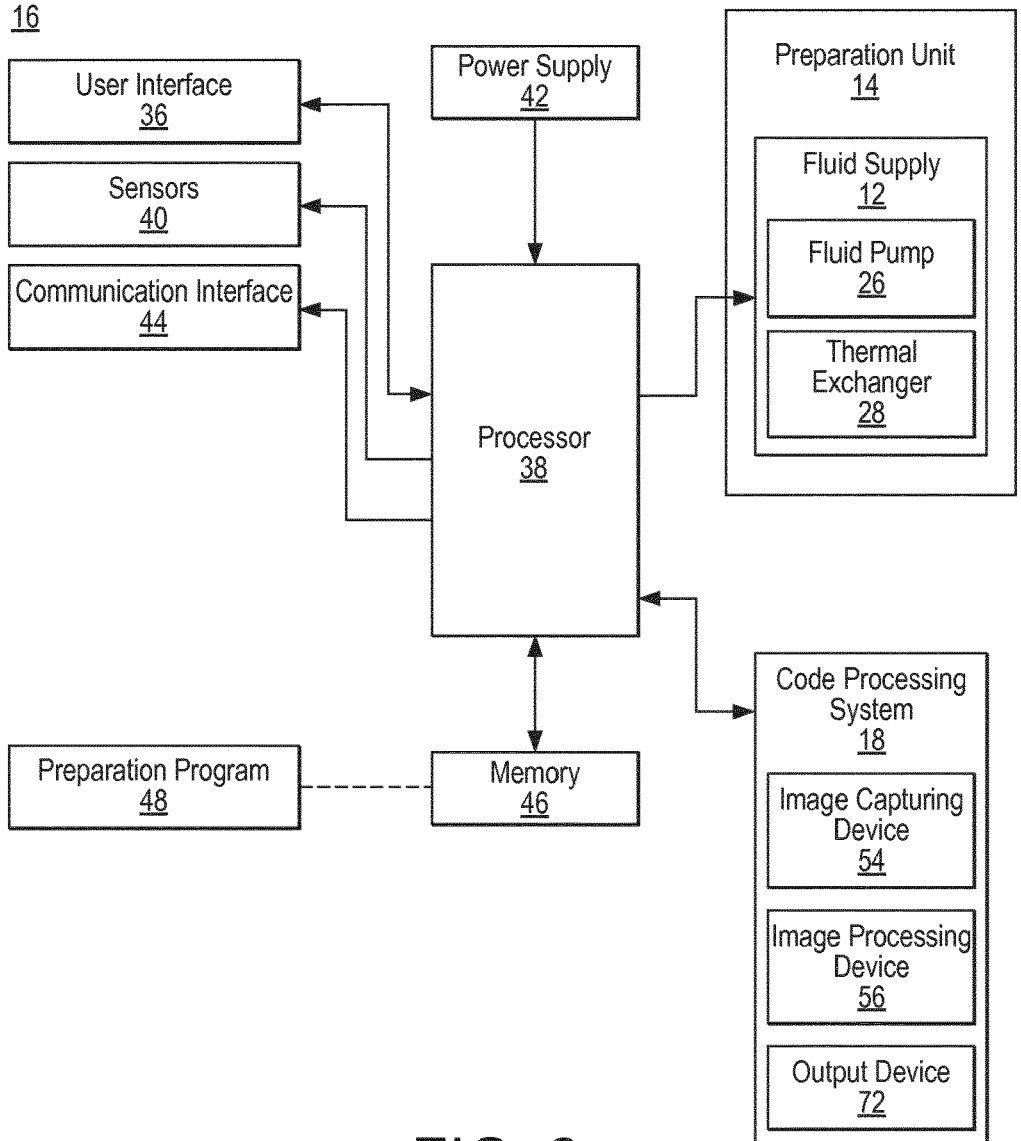
FIG. 2 is a block diagram illustrating a control system and code processing subsystem for the preparation machine of FIG. 1 according to an embodiment of the present disclosure.

The control system 16, an example of which is illustrated in FIG. 2, is operable to control the preparation unit 14 to prepare the beverage/foodstuff. The control system 16 typically comprises: a user interface 36; a processor 38; optional sensors 40; a power supply 42; an optional communication interface 44, which are described sequentially.

The user interface 36 comprises hardware to enable a user to interface with the processor 38 and hence is operatively connected thereto. More particularly: the user interface receives commands from a user; the user interface signal transfers the said commands to the processor 38 as an input. The commands may, for example, be an instruction to execute a preparation process and/or to adjust an operational parameter of the preparation machine 4 and/or to power on or off the beverage preparation machine 4. The processor 38 may also output feedback to the user interface 36 as part of the preparation process, e.g. to indicate the beverage preparation process has been initiated or that a parameter associated with the process has been selected. The hardware of the user interface 36 may comprise any suitable device(s), for example, the hardware comprises one or more of the following: buttons, such as a joystick button or press button; joystick; LEDs; graphic or character LDCs; graphical screen with touch sensing and/or screen edge buttons.

The sensors 40 are operatively connected to the processor 38 to provide an input for monitoring of the preparation process and/or a status of the preparation machine 4. The input can be an analogue or digital signal. The sensors 40 typically comprise one or more of the following: fluid level sensors associated with the reservoir 24; flow rate sensors associated with the fluid pump 26; temperature sensors associated with the thermal exchanger 28. In the first and second embodiment of the preparation machine 4, the sensors may further comprise: fluid level sensors operable to measure a fluid level in the receptacle; sensors for measuring a temperature of a product in the receptacle; sensors for measuring the toque applied by the mixing head of the agitator unit 30 to the product; sensors for measuring the velocity of the mixing head of the agitator unit 30; receptacle detection sensors to detect the presence of the receptacle supported by the receptacle support 52. In the third embodiment of the preparation machine 4, the sensors may further comprise: position sensors associated with the preparation unit 14 that are operable to sense the position thereof; container 6 (e.g. the capsule or packet) detection sensors to detect the presence of the container supplied by a user.

The processor 38 is operable to: receive an input, e.g. the commands from the user interface 36 and/or from the sensors 40; process the input according to program code stored on a memory unit (or programmed logic); provide an output, which is generally a preparation process. In particular the output may comprise: operating the code processing system 18 to determine preparation information on the container 6; operating the preparation unit 14 in accordance with the determined information. Operation of the preparation unit 14 can be open-loop control, or more preferable closed-loop control using the input signal from the sensors 40 as feedback. The processor 38 generally comprises memory, input and output system components, which are arranged as an integrated circuit, typically as a microprocessor or a microcontroller. The processor 38 may comprise other suitable integrated circuits, such as: an ASIC; a programmable logic device such as an FPGA; an analogue integrated circuit, such as a controller. For such devices, where appropriate, the aforementioned program code can be considered programmed logic or to additionally comprise programmed logic. The processor 38 may also comprise one or more of the aforementioned integrated circuits, i.e. multiple processors. The processor 38 generally comprises a memory unit 46 for storage of the program code and optionally data. The memory unit typically comprises: a non-volatile memory e.g. EPROM, EEPROM or Flash for program code and operating parameter storage; volatile memory (RAM) for data storage. The memory unit may comprise separate and/or integrated (e.g. on a die of the processor) memory.

The program code stored on a memory unit (or programmed logic) can be idealised as comprising a preparation program 48 that is executable by the processor 38 to execute said preparation process. Typically the preparation process comprises: determining the preparation information from the container (i.e. by interfacing with the code processing system 18); using to control said comprising the information and/or other information that may be stored as data on the memory unit 46 and/or input via the user interface 36. The determined information may as an alternative or in addition be used by the preparation program 48 or a device in communication therewith (e.g. a server communicating with the preparation machine over a network such as the internet via a communication interface): to monitor container 6 consumption for re-ordering; to scheduled maintenance of the preparation machine; to monitor machine usage.

The power supply 42 is operable to supply electrical energy to the processor 38 and associated components. The power supply 42 may comprise various means, such as a battery or a unit to receive and condition a mains electrical supply. The power supply 42 may be operatively linked to part of the user interface 36 for powering on or off the preparation machine 4.

The communication interface 44 is for data communication of the beverage preparation machine 4 with another device/system, typically a server system. The communication interface 44 can be used to supply and/or receive information related to the preparation process, such as container consumption information and/or preparation process information. The communication interface 44 can be configured for cabled media or wireless media or a combination thereof, e.g.: a wired connection, such as RS-232, USB, I$^2$C, Ethernet define by IEEE 802.3; a wireless connection, such as wireless LAN (e.g. IEEE 802.11) or near field communication (NFC) or a cellular system such as GPRS or GSM. The communication interface 44 is operatively connected to the processor 38. Generally the communication interface comprises a separate processing unit (examples of which are provided above) to control communication hardware (e.g. an antenna) to interface with the maser processor 38. However, less complex configurations can be used e.g. a simple wired connection for serial communication directly with the processor 38.

Code Processing System

The code processing system 18 is operable: to obtain an image of a code on the container 6; to process said image to decode the encoded preparation information. The code processing system 18 comprises an: image capturing device 54; image processing device 56; output device 72, which are described sequentially.

The image capturing device 54 is operable to capture a digital image of the code and to transfer, as digital data, said image to the image processing device 56. To enable the scale of the digital image to be determined: the image capturing device 54 is arranged a predetermined distance away from the code when obtaining the digital image; in an example wherein the image capturing device 54 comprises a lens the magnification of the lens is preferably stored on a memory of the image processing device 56. The image capturing device 54 comprises any suitable optical device for capturing a digital image consisting of the latter discussed micro-unit code composition; examples of suitable optical devices are: Sonix SN9S102; Snap Sensor S2 imager; an over-sampled binary image sensor.

The image processing device 56 is operatively connected to the image capturing device 54 and is operable to process said digital data to decode preparation information encoded therein. Processing of the digital data is discussed in the following paragraphs. The image processing device 56 may comprise a processor such as a microcontroller or an ASIC. It may alternatively comprise the aforesaid processor 38, in such an embodiment it will be appreciated that the output device is integrated in the processor 38. For the said processing the image processing device 56 typically comprises a code processing program. An example of a suitable image processing device is the Texas Instruments TMS320C5517.

The output device 72 is operatively connected to the image processing device 56 and is operable to output digital data that comprises the decoded preparation information to the processor 38, e.g. by means of a serial interface.

Container

The container 6 may comprise, depending on the embodiment of the preparation machine 4 a: receptacle comprising preparation material for preparation and end-user consumption therefrom; a capsule or packet comprising preparation material for preparation therefrom. The container 6 may be formed from various materials, such as metal or plastic or a combination thereof. In general the material is selected such that it is: food-safe; it can withstand the pressure/temperature of the preparation process. Suitable examples of containers are provided following.

The container 6 when not in packet form generally comprises: a body portion 58 defining a cavity for the storage of a dosage of a preparation material; a lid portion 60 for closing the cavity; a flange portion 62 or other suitable arrangement for connection of the body portion and flange portion, the flange portion generally being arranged distal a base of the cavity. The body portion may comprise various shapes, such as a disk, frusto-conical or rectangular cross-sectioned. Accordingly, it will be appreciated that the capsule 6 may take various forms, an example of which are provided in FIG. 3A, which may generically extend to a receptacle/capsule as defined herein. The container 6 may be distinguished as a receptacle for end-user consumption therefrom when configured with an internal volume of 150-350 ml. In a similar fashion a capsule may by distinguished when configured with an internal volume of less than 100 ml. The container 6 in collapsible configuration may comprise an internal volume of 5 ml-250 ml.

Figure 3A:
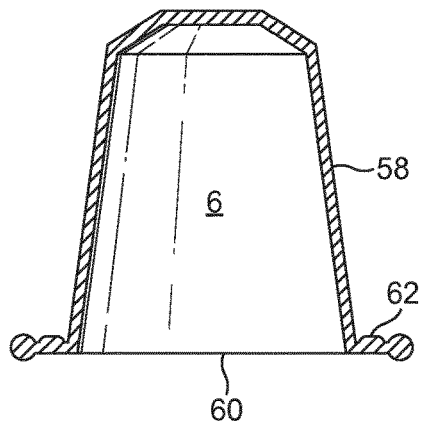
FIG. 3 is diagrammatic drawing illustrating containers for the preparation machine of FIG. 1 according to embodiments of the present disclosure.
Figure 3B:
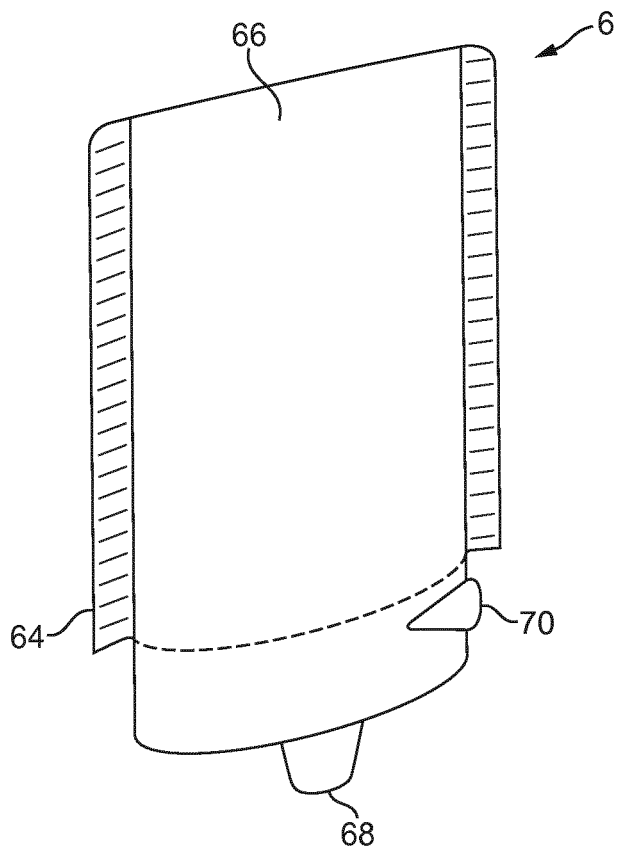

The container 6 when in packet form as shown in FIG. 3B generally comprises: an arrangement of sheet material 64 (such as one or more sheets joined at their periphery) defining an internal volume 66 for the storage of a dosage of a preparation material; an inlet 68 for inflow of fluid into the internal volume 66; an outlet 70 for outflow of fluid and beverage/foodstuff material from the internal volume. Typically the inlet 68 and outlet 70 are arranged on a body of an attachment (not shown), which is attached to the sheet material. The sheet material may be formed from various materials, such as metal foil or plastic or a combination thereof. Typically the volume 66 may be 150-350 ml or 200-300 ml or 50-150 depending on the application.

Information Encoded by Code

A code 74 of the container 6 encodes preparation information, which generally comprises information related to the associated preparation process. Depending of the embodiment of the preparation machine 4 said information may encode one or more parameters, which may comprise one of more of a: fluid temperature (at container inlet and/or outlet to receptacle); fluid mass/volumetric flow rate; fluid volume; phase duration (e.g. a duration for applying the aforesaid parameters); container geometric parameters, such as shape/volume; other container parameters e.g. a container identifier, expiry date, which may for example be used to monitor container consumption for the purpose of container re-ordering.

Specifically in respect of the first embodiment preparation machine 4 said encoded parameters may comprise one or more of a: percentage cooling or heating power to apply (e.g. the power applied by the thermal exchanger 34); torque applied by the agitator unit 30; one or more angular velocities (e.g. a gyration and radial angular velocities W1, W2); container temperature (e.g. the temperature set by the thermal exchanger 34); time of a particular phase of preparation for which the aforesaid one or more parameters are applied for; phase identifier, e.g. an alphanumeric identifier, to identify which of a plurality of phases the aforesaid one or more parameters relate.

Arrangement of Code

The code is arranged on an exterior surface of the container 6 in any suitable position such that it can be processed by the code processing system 18. In the afore-discussed example of a receptacle/capsule, as shown in FIG. 3A, the code can be arranged in any exterior surface thereof, e.g. the lid, body or flange portion. In the afore-discussed example of a packet 6, as shown in FIG. 3B, the code can be arranged in any exterior surface thereof, e.g. either or both sides of the packet, including the rim.

Composition of Code

The code 74 is configured to encode the preparation information in a manner for capturing by the image capturing device 54. More particularly, the code is formed of a plurality of units 76, preferably micro units, with a surround of a different colour: typically the units comprise a dark colour (e.g. one of the following: black, dark blue, purple, dark green) and the surround comprises a light colour (e.g. one of the following: white, light blue, yellow, light green) or the converse, such that there is sufficient contrast for the image processing device 56 to distinguish therebetween. The units 76 may have one or a combination of the following shapes: circular; triangular; polygon, in particular a quadrilateral such as square or parallelogram; other known suitable shape. It will be appreciated that due to formation error, e.g. printing error, the aforesaid shape can be an approximation of the actual shape. The units 76 typically have a unit length of 50-200 μm (e.g. 60, 80, 100, 120, 150 μm). The unit length is a suitably defined distance of the unit, e.g.: for a circular shape the diameter; for a square a side length; for a polygon a diameter or distance between opposing vertices; for a triangle a hypotenuse. The units 76 are preferably arranged with a precision of about 1 μm.

Whilst the code is referred to as comprising a plurality of units it will be appreciated that the units may alternatively be referred to as elements or markers.

Typically the units 76 are formed by: printing e.g. my means of an ink printer; embossed; engraved; otherwise known means. As an example of printing the ink may be conventional printer ink and the substrate may be: polyethylene terephthalate (PET); aluminium coated with a lacquer (as found on Nespresso™ Classic™ capsules) or other suitable substrate. As an example of embossing the shape may be pressed into a plastically deformable substrate (such as the aforesaid aluminium coated with a lacquer) by a stamp.

The units 76 are organised into a: data portion 78 to encode the preparation information; reference portion 80 to provide a reference for the data portion 78. The reference portion 80 comprises a plurality of reference units 86, the centres of which have a linear arrangement to define a reference line r, with one of the reference units generally defines an reference line r orientation identifier 88. The data portion 78 comprises an encoding area 90, within the bounds of which the data units 82 are arranged. A data unit 82 is arranged on an encoding line D that intersects the reference line r. Generally the data unit is able to occupy any continuous distance d along the data line D, as opposed to discrete positions only (i.e. discrete meaning predetermined positions only), as a variable to encode a parameter of the preparation information. In this respect a wider range of information may be encoded. The data portion 78 comprises n data units 82, wherein n is numerically 1 or more, and thus generally encodes n parameters. In a similar fashion the reference portion 80 comprises m reference units 86, wherein m is numerically at least two.

More particularly the encoding line D intersects the reference line r at a reference position 84. A reference position 84 may or may not comprise a reference unit 86. The distance d is defined from the reference position to a position on the encoding line D which a centre of the data unit 82 is arranged on, or arranged proximate thereto, e.g. at a position on the encoding line D which is intersected by a line through the centre of the data unit 82, whereby said line is orthogonal to the encoding line D at the point of intersection.

Code with Cartesian Coordinate Arrangement

Figure 4:
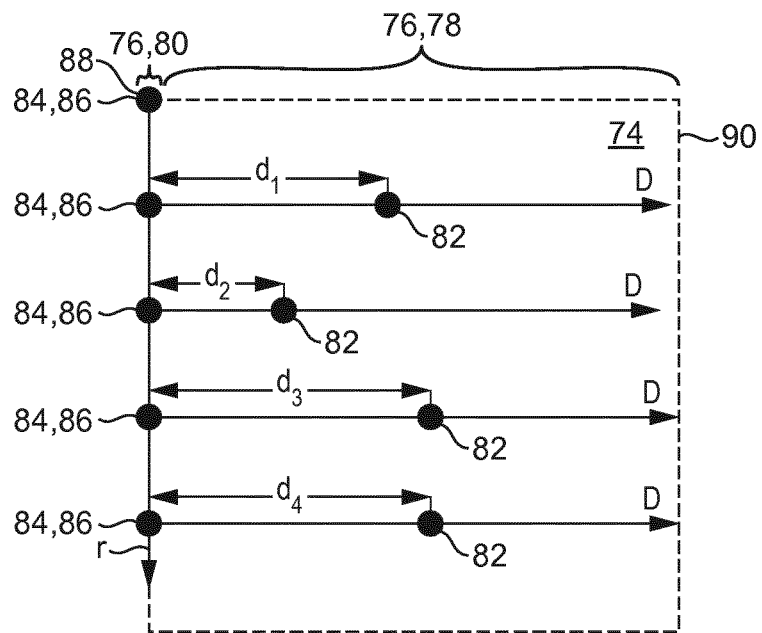
FIGS. 4-5 are plan views showing to scale codes for the containers of FIG. 3 according to embodiments of the present disclosure.

According to a first embodiment of the code 74, an example of which is illustrated in FIG. 4, the code comprises a right-angled parallelogram planform, i.e. a square or rectangle. Typically the planform has a side length of 600-1600 μm, or about 1100 μm, which will depend on the number of parameters encoded. Note in FIG. 4 (and those following) the reference line r and encoding line D are shown for illustrative purposes only, that is to say they do not require physical formation as part of the code, rather they can be defined virtually when an image of the code is processed as will be discussed.

The reference portion 80 comprises m reference units 86, (five are illustrated) with a linear arrangement. The said reference units 86 define the reference line r. One of the reference units 86 defines a reference line orientation identifier 88, which enables determination of the orientation of the reference line r and associated reference positions 84, e.g. each reference position 84 is a predetermined distance (such as 100-200 μm or 160 μm) along the reference line r from the orientation identifier 88. The orientation identifier 88 may be identifiable as one or a combination of: a reference unit 86 that does not have associated therewith a data unit 82; a different shape from the other reference units; a reference unit arranged at an end of the reference line r, in the illustrated example the latter is shown. Numbering of the reference positions 84 herein comprises the lowest number reference position 84 proximate the orientation identifier 88, increasing consecutively to the highest number reference position 84 distal thereto, as indicated by the corresponding distances $d_{1-n}$.

As shown in the illustrated example, the reference line r may be arranged a predetermined minimum distance away from the encoding area 90 of the data portion 78, e.g. by 50 μm-150 μm or 100 μm, to ensure adequate separation of the reference units 86 and data units 82. Alternatively the reference line r bounds the encoding area 90.

The data portion 78 comprises an encoding area 90, which may be 600-1200 μm, or preferably about 800 μm) wherein the data units 82 thereof are arranged. There are n data units 82 (four are illustrated) with each arranged at a perpendicular distance d along an encoding line D from the reference line r. A point of intersection between D and r defines the reference position 84. Each data unit 82 may have a corresponding reference unit 86 at the associated reference position 84 (as shown in the figure). Alternatively there is no reference unit at the reference position 84, whereby the reference position 84 is defined virtually, e.g. it is interpolated by a predetermined distance from an adjacent reference unit 86. More than one data unit 82 can be arranged along an encoding line D, e.g. so that multiple parameters are encoded on an encoding line D or so that each parameter has multiple values associated therewith, examples of which will be provided. A value of a parameter is encoded by the perpendicular distance d of the data unit 82 from its associated reference position 84.

Each data unit 82 (or further data units) optionally encodes metadata about an associated parameter. The metadata is generally encoded discretely, i.e. it can only assume certain values. Various examples of encoding the metadata are given following.

Figure 5A:
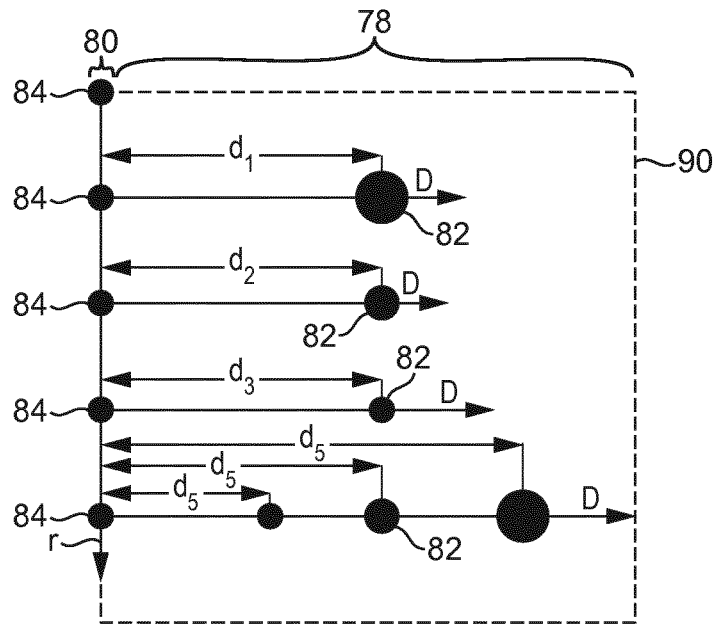

In a first embodiment, an example of which is illustrated in FIG. 5A, a metadata is encoded as a characteristic size (e.g. the size defined by the above-defined unit length or area) of the data unit 82, the size being identifiable as a variable by the image processing device 56. Particularly, the size may be one of a list of 2 or 3 or 4 particular sizes, e.g. selected from 60, 80, 100, 120 µm. In a particular example, which is illustrated at the first-third reference positions 84, the size of the data unit 82 may be a one of three sizes. In a particular example, which is illustrated at the fourth reference position 84, there are three parameters encoded, the data unit 82 of each parameter being identifiable by the metadata of the three different sizes.

Figure 5B:
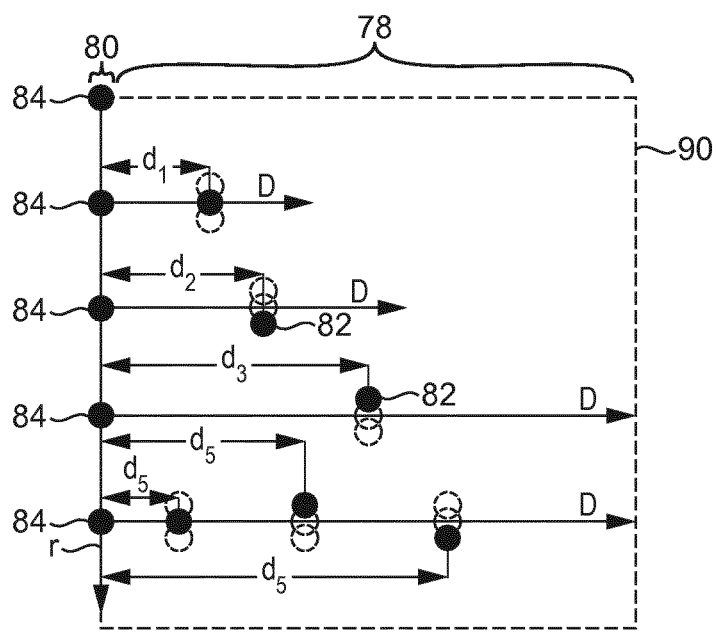

In a second embodiment, an example of which is illustrated in FIG. 5B, metadata is encoded as a characteristic position of the data unit 82 with respect to the arrangement of the data unit 82 in a direction parallel to the reference line r. In spite of the offset the encoding line D still intersects the data unit 82. In particular: the data unit 82 may be offset in a first or second position with respect to the encoding line D to encode two values of the metadata; the data unit 82 may be offset in the first or second position or arranged in a third position on the encoding line D to encode three values of the metadata. The first and second position may be defined by a centre of the data unit 82 arranged a particular distance away from the encoding line D, e.g. at least 20 µm. The third position may be defined by a centre of the data unit 82 arranged less than a particular distance away from the encoding line D, e.g. less than 5 µm. In a particular example, which is illustrated at the first-third reference positions 84, the data unit 82 may be in a first, second or third position to encode metadata. In a particular example, which is illustrated at the fourth reference position, the said reference position has three parameters encoded therewith, the data unit 82 of each parameter being identifiable by the metadata of the position of the data unit 82.

Figure 5C:
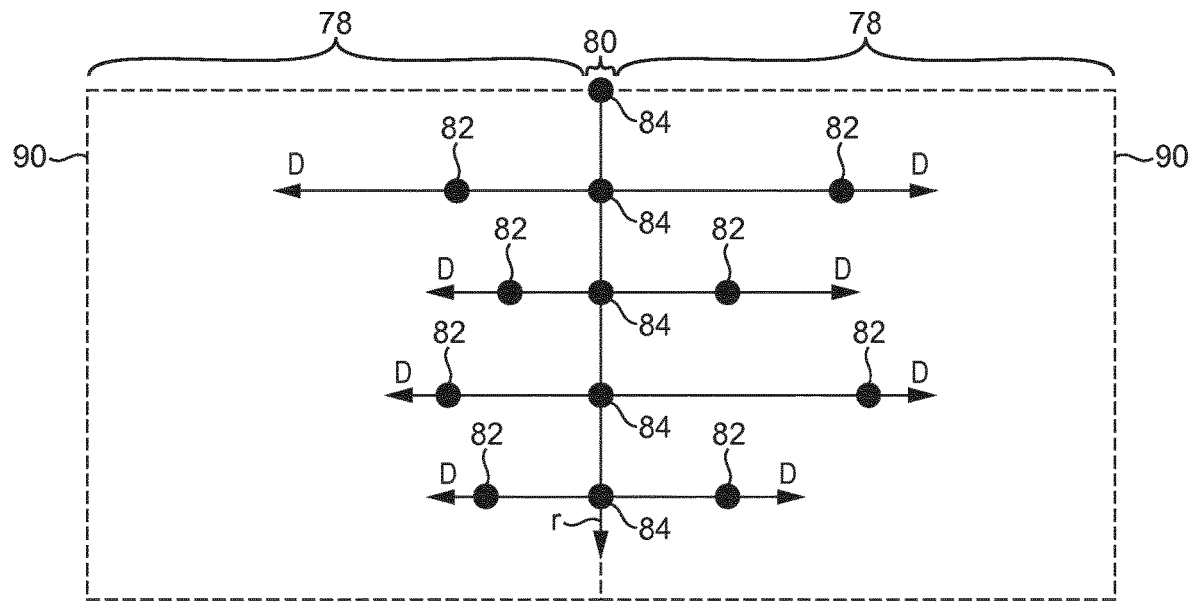

In a third embodiment, an example of which is illustrated in FIG. 5C, metadata is encoded as a characteristic position of one or two data units 82 with respect to their arrangement on either side of the reference line r. As examples: a data unit 82 on the left of the reference line r may encode a negative of the parameter and a data unit 82 one the right of the reference line r may encode a positive of the parameter or the converse; for the same parameter a data unit 82 on the left of the reference line r may encode a mantissa, a data unit 82 one the right of the reference line r may encode an exponent or the converse arrangement; a data unit 82 on the left of the reference line r may encode the same parameter as that on the right such that an average can be taken for enhanced accuracy.

Figure 5D:
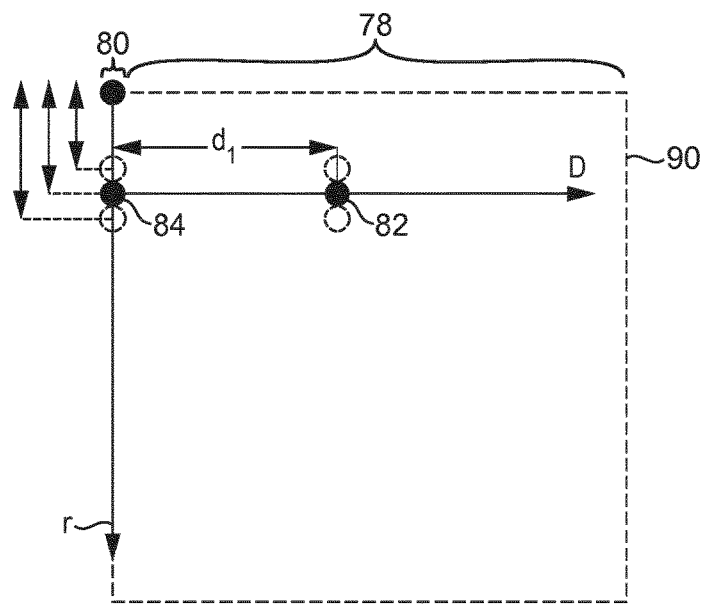

In a fourth embodiment, an example of which is illustrated in FIG. 5D, metadata is encoded as a characteristic position of the data unit 82 with respect to the arrangement of the data unit 82 along the reference line r from the orientation identifier 88. The fourth embodiment is similar to the second embodiment however the associated reference unit 86 moves with the data unit 82, e.g. to define 2 or 3 (as illustrated) positions.

In a fifth embodiment (not shown) metadata is encoded as a characteristic shape. For example the shape may be one of a list of: circular; triangular; polygon. In a sixth embodiment (not shown) metadata is encoded as a characteristic colour. For example the colour may be one of a list of: red; green; blue, suitable for identification by an RGB image sensor.

The first-sixth embodiments may be suitably combined, e.g. an encoded parameter may have metadata encoded with a combination of the first and second embodiment.

Figure 5E:
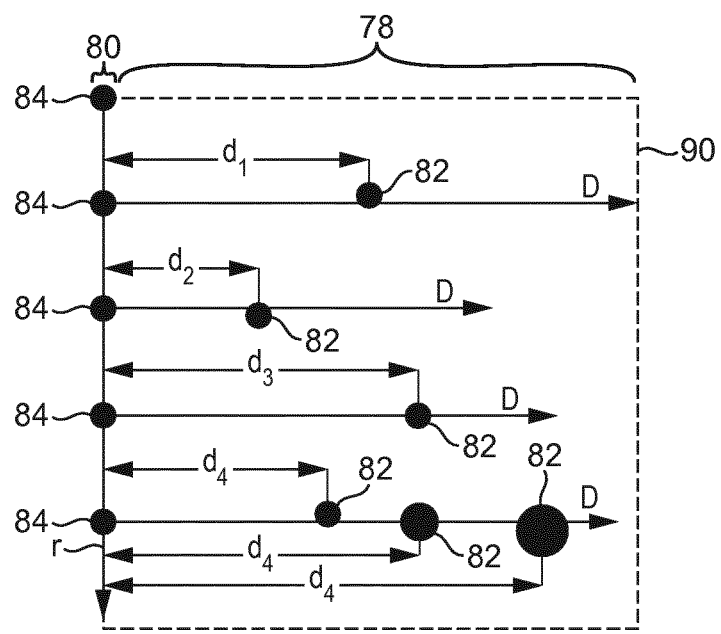

A specific example of the code 74 for the first embodiment of the preparation machine 4, is illustrated in FIG. 5E, wherein: the first reference position 84 and second reference position 84 have associated data units 82 that encode parameters that have metadata encoded according to the second embodiment (i.e. 2 values for the metadata); the third reference position 86 has a data unit 82 that encodes a parameter without any metadata; the fourth reference position 84 has three data units 82, each encoding a parameter, the parameter having metadata encoded according to a combination of the first and second embodiment (i.e. 3 values for the size of the unit and 3 values for the position of the unit, hence a total of 9 possible values of the metadata).

In particular: the first and second reference positions 84 encode the respective radial angular velocity W1 and the gyration angular velocity W2, with optionally the position above and below the associated encoding line D designating respective positive and negative angular velocities; the third reference position 84 encodes a percentage cooling power to apply; the fourth reference position encodes time, temperature, torque as the respective small, medium and large data units in particular positions, whereby these parameters represent triggers such that when a condition set by one of them is achieved then the phase encoded by the code 74 is compete.

Method of Processing Code

The code processing system 18 processes the code to determine the preparation information by: obtaining by means of the image capturing device 54 a digital image of the code; processing by means of the image processing device 56 digital data of the digital image to decode the preparation information; outputting by means of the output device 72 said decoded preparation information.

Processing of the digital data comprises: locating the units 82, 86 in the code; identifying the reference units 86 and determining therefrom a reference line r; determining for each data unit 82 a distance d along the encoding line D from the reference line r, each of which will be described sequentially.

Locating the units 82, 86 in the code is generally achieved by conversion of the pixels represented in the digital data to a one-bit bi-tonal black and white image, i.e. a binary image, whereby the associated conversion parameters are set to distinguish the units from their surrounding base level. Alternatively an oversampled binary image sensor may be used as the image capturing device 54 to provide the binary image. Locations of the centre of units may be determined by a feature extraction technique such as circle Hough Transform. Different sized units may be identified by pixel integration.

Identification of the reference units 86 and determining therefrom a reference line r, is generally achieved by identification of one or a combination of: units that have a linear arrangement; units that are a predetermined distance apart; units that are a particular shape or size. An orientation identifier of the reference line r can be determined by: a reference unit 86 that is a difference shape or size from the other reference units; a reference unit 86 that does not have associated therewith a data unit 82 on an encoding line D.

Determining for each data unit 82 a distance d along the encoding line D from the associated reference position 84 of the reference line r is generally achieved by determining the distance from the centre of a data unit 82 to the associated reference position 84. The determined distance can be corrected using the magnification and/or distance of the image capturing device 54 away from the code 74 when the image was captured.

To determine a value $V_p$ of the parameter associated with the determined distance d, stored information can be utilised that defines a relationship between the parameter and distance d. This step may be performed at the image processing device 56 or processor 38. The relationship may be linear, e.g. $V_p \propto d$. Alternatively it may be non-linear. A non-linear relationship may comprise a logarithmic relationship, e.g. $V_p \propto \log(d)$ or an exponential relationship, e.g. $V_p \propto e^d$. Such a relationship is particular advantageous when the accuracy of a parameter is important at low values and less important at high values or the converse e.g. for the first embodiment of the preparation machine 4 the accuracy of the angular velocities W1, W2 of the mixing unit are more important at a low angular velocity than at a high angular velocity, hence a logarithmic relationship is preferable.

The aforesaid metadata about the parameter can be determined depending on the embodiment of encoding, e.g.: in the first example by determining for the associated data unit 82 a unit length by feature extraction or overall area by pixel integration; in the second example by determining for the associated data unit 82 an offset to the encoding line D by feature extraction; in the third and fourth example by determining the centre of the associated data units by feature extraction.

Machine and Container Attachments

Figure 6:
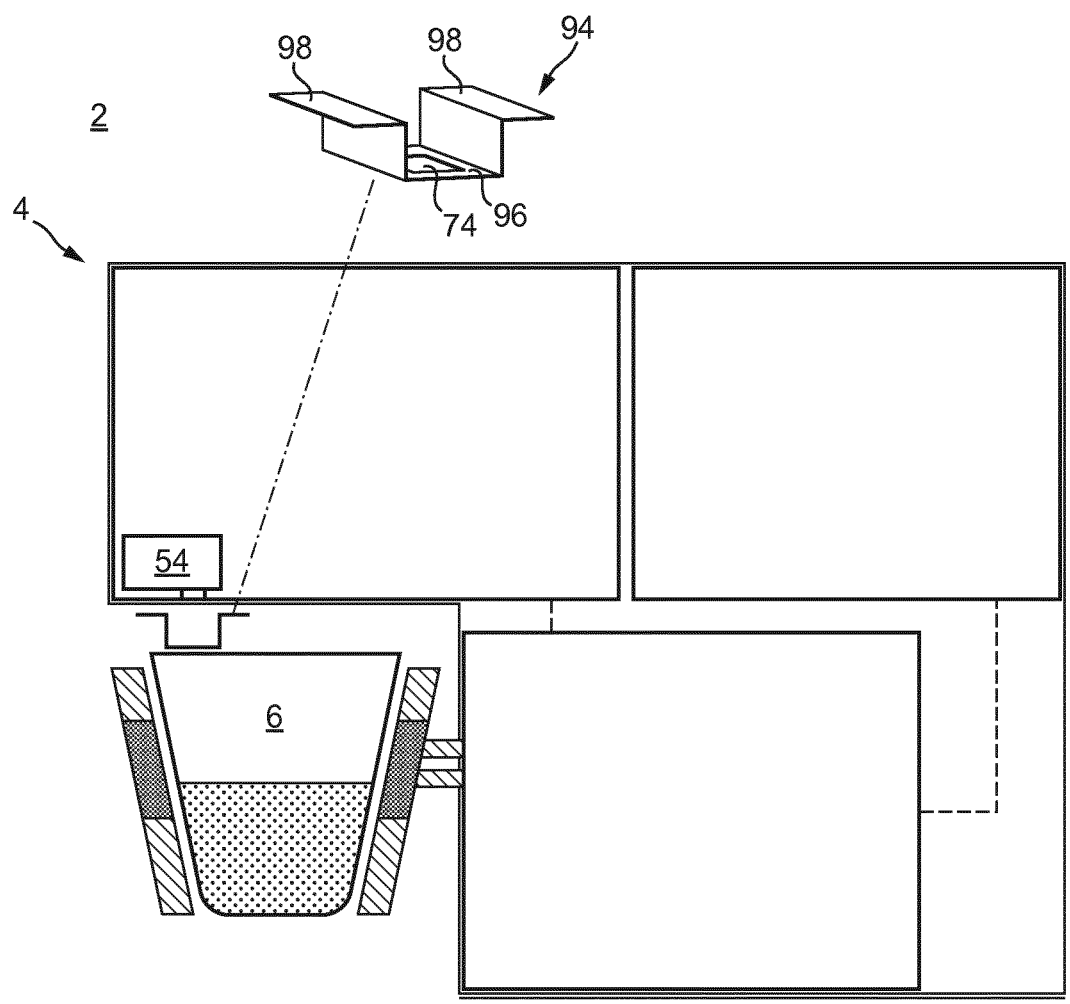
FIG. 6-7 are diagrammatic drawings illustrating attachments for the system of FIG. 1 according to embodiments of the present disclosure.

An attachment 94 may comprise the afore-described code 74 arranged on a surface thereof, the attachment 94 configured for attachment to the afore-described beverage or foodstuff preparation machine 4. The attachment, an example which is illustrated in FIG. 6, comprises: a carrier 96 for carrying the code 74; an attachment member 98 for attachment of the carrier 96 to the machine 4 between an image capturing device 54 of said machine 4 and a container 6 received by said machine 4 and proximate said container. In this way an image of the code 74 can be captured by the image capturing device 54 as if it were attached to the container 6. Examples of suitable attachment members comprise: extensions attached to said carrier comprising an adhesive strip (as illustrated); a mechanical fastener such as a clip, bolt or bracket.

Figure 7:
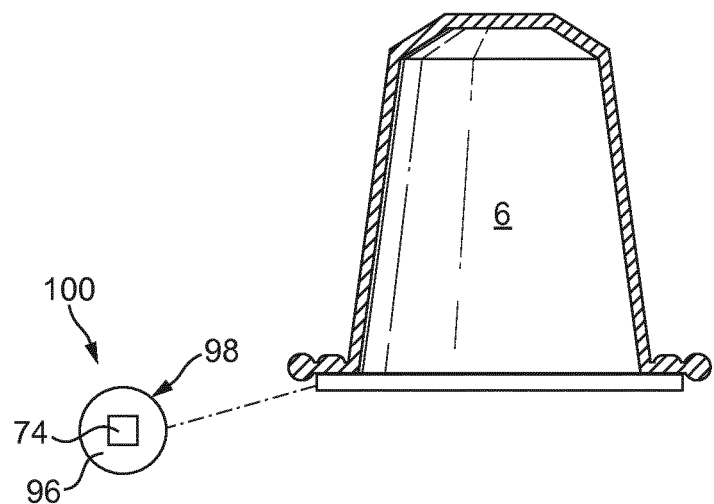

An alternate attachment 100 may comprise the afore-described code 74, arranged on a surface thereof, the attachment 100 configured for attachment to the afore-described container 6. The attachment 100, an example which is illustrated in FIG. 7, comprises: a carrier 96 for carrying of the code 74; an attachment member 98 for attachment of the carrier 96 to the container 6. In this way an image of the code 74 can be captured by the image capturing device 54 as if it were formed integrally one the container 6 Examples of suitable attachment members comprise: an adhesive strip (as illustrated); a mechanical fastener such as a clip, bolt or bracket.

LIST OF REFERENCES

2 Preparation system
4 Preparation machine
  10 Housing
    20 Base
    22 Body
  14 Preparation unit
    12 Fluid supply
      24 Reservoir
      26 Fluid pump
      28 fluid thermal exchanger
    Embodiment 1
      30 Agitator unit
    32 Auxiliary product unit
    34 Thermal exchanger
    52 Receptacle support
  16 Control system
    36 User interface
    38 Processor
      46 Memory unit
        48 Preparation program
    40 Sensors (temperature, receptaclelevel, flow rate, torque, velocity)
    42 Power supply
    44 Communication interface
  18 Code processing system
    54 Image capturing device
    56 Image processing device
    72 Output device
6 Container
  Capsule/Receptacle
  58 Body portion
  60 Lid portion
  62 Flange portion
  Packet
  64 Sheet material
  66 Internal volume
  68 Inlet
  70 Outlet
    74 Code
      76 Unit
        78 Data portion
          90 Encoding area
          82 Data unit
        80 Reference portion
          84 Reference position
          86 Reference unit
            88 Orientation identifier

The invention claimed is:

1. A container for a beverage or foodstuff preparation machine, the container containing beverage or foodstuff material and comprising a code encoding preparation information, the code comprising a reference portion and a data portion:

the reference portion comprising an arrangement of at least two reference units to define a reference line r;

the data portion having an encoding area comprising a data unit, wherein the data unit is arranged on an encoding line D that intersects the reference line r, the data unit is arranged any continuous distance d extending along the encoding line D from the intersection of the encoding line D and the reference line r within bounds of the encoding area, the continuous distance d encoding a value of a parameter of the preparation information, whereby said encoding line D is linear and arranged orthogonal to the reference line r.

2. The container of claim 1, wherein the code has a peripheral length of 600-1600 μm.

3. The container of claim 1, wherein the reference portion comprises a reference line orientation identifier, the reference line orientation identifier is without an associated encoding line D and a data unit.

4. The container of claim 1, wherein the encoding line D intersects the reference line r at a reference position, the reference position absent a reference unit, whereby the reference position is arranged at a predetermined distance along the reference line r.

5. The container of claim 4, wherein a portion of the encoding area is bounded by the reference line r or overlaps the reference line r.

6. The container of claim 1, wherein the encoding line D intersects the reference line r at a reference position, whereby the reference position comprises a reference unit.

7. The container of claim 1, wherein the data unit further encodes metadata associated with the parameter of the preparation information, the metadata being encoded discretely to enable identification of the parameter of the preparation information and/or a property associated with the parameter of the preparation information.

8. The container of claim 7, wherein a unit length of the data unit is selected from one of a plurality of predetermined data unit lengths as a variable to encode the metadata.

9. The container of claim 7, wherein an offset of a center of the data unit from the encoding line D along a linear line, the linear line at a point of intersection with the encoding line D is orthogonal thereto, is selected from one of a plurality of predetermined offsets as a variable to encode the metadata.

10. The container of claim 7, wherein a plurality of data units are arranged along the encoding line D, whereby each data unit encodes a separate parameter, and each data unit is identifiable by said metadata.

11. The container of claim 7, wherein the data unit is in a shape selected from the group consisting of triangular, polygon, square and parallelogram, and the shape of the data unit encodes the metadata.

12. The container of claim 1, wherein the code is formed on a surface of the container or on an attachment configured for attachment to the container.

13. The container of claim 1, wherein the container has a form selected from the group consisting of: a capsule; a packet; a receptacle for consumption of the beverage or foodstuff therefrom; and a collapsible container.

14. The container of claim 1, wherein a plurality of data units are arranged along the encoding line D, whereby the distance d encoding the parameter of the preparation information is an average of the distances of the plurality of data units from the reference line r.

15. A beverage or foodstuff preparation system comprising: a container containing beverage or foodstuff material and comprising a code encoding preparation information, the code comprising a reference portion and a data portion:
    the reference portion comprising an arrangement of at least two reference units to define a reference line r; the data portion having an encoding area comprising a data unit, wherein the data unit is arranged on an encoding line D that intersects the reference line r, the data unit is arranged any continuous distance d extending along the encoding line D from the intersection from the intersection of the encoding line D and the reference line r within bounds of the encoding area, the continuous distance d encoding a value of a parameter of the preparation information, whereby said encoding line D is linear and arranged orthogonal to the reference line r;
    a preparation unit configured to receive the container and to prepare the beverage or foodstuff therefrom;
    a code processing system operable to: obtain a digital image of the code of the container;
    process the digital image to decode the encoded preparation information; and
    a control system operable to control the preparation unit using said decoded preparation information.

16. The beverage or foodstuff preparation system of claim 15, wherein the code processing subsystem is configured to locate the at least two reference units and the data unit of the code; identify the at least two reference units and determine therefrom the reference line r; determine for the data unit a distance d along the encoding line D from the reference line r; and convert the distance d into an actual value of a parameter $V_p$, using a stored relationship between the parameter $V_p$ and the distance d.

17. A method of encoding preparation information, the method comprising forming a code on:
    a container for a beverage or foodstuff preparation machine, the container containing beverage or foodstuff material; or an attachment configured for attachment to said container or a beverage of foodstuff preparation machine,
    the method further comprising:
    arranging at least two reference units for defining a reference line r of a reference portion; and
    at least partially encoding a value of a parameter of the preparation information with a data portion of the code by arranging a data unit on an encoding line D that intersects the reference line r at an intersection point, the data unit being arranged any continuous distance d extending along the encoding line D from the intersection point, the continuous distance d encoding the value of a parameter of the preparation information, whereby the encoding line D is linear and is arranged orthogonal the reference line r at the intersection point.

* * * * *